Jan. 20, 1948. H. A. BURDWOOD 2,434,640
MACHINE FOR STRIPPING COVERED CABLES
Filed Oct. 31, 1945 2 Sheets-Sheet 1
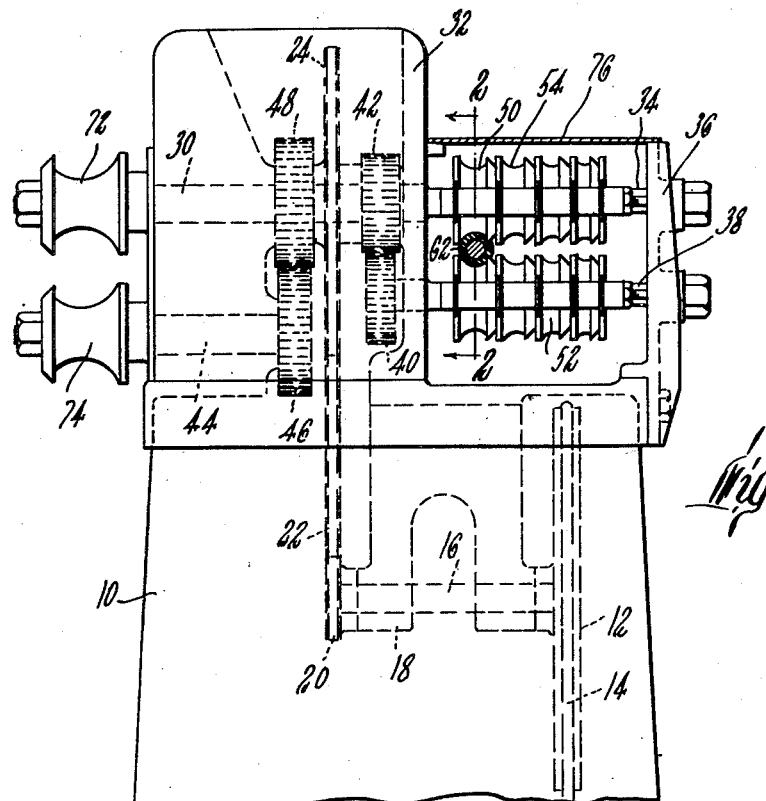
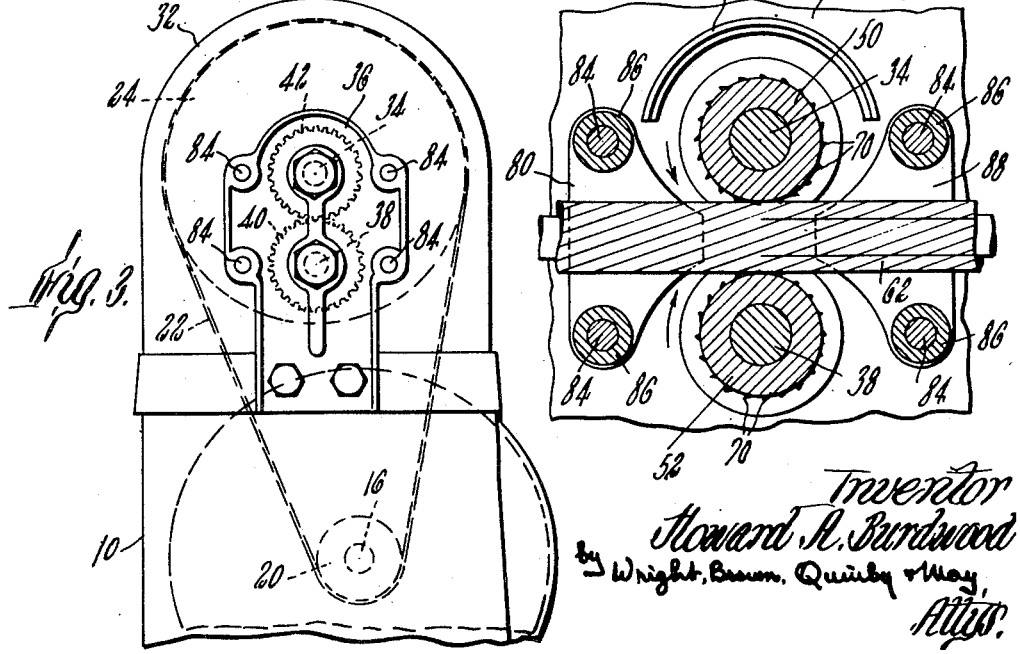

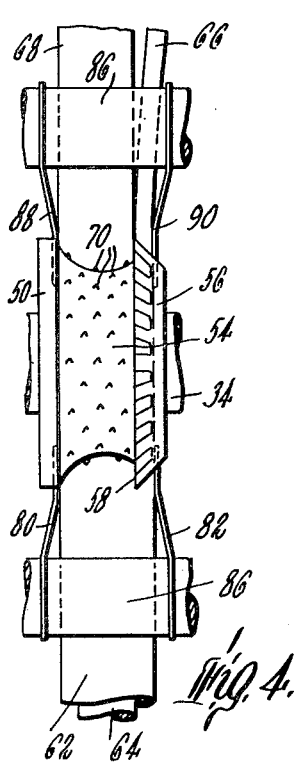
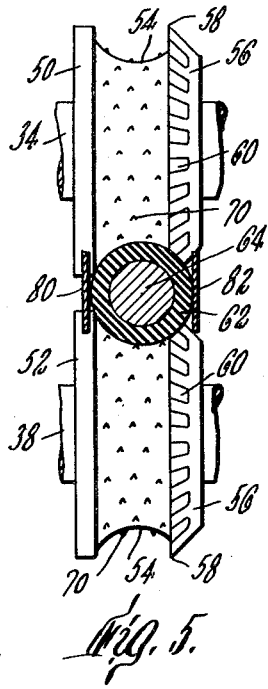
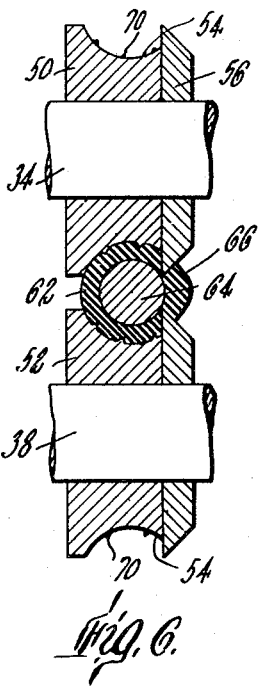
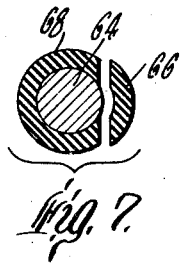
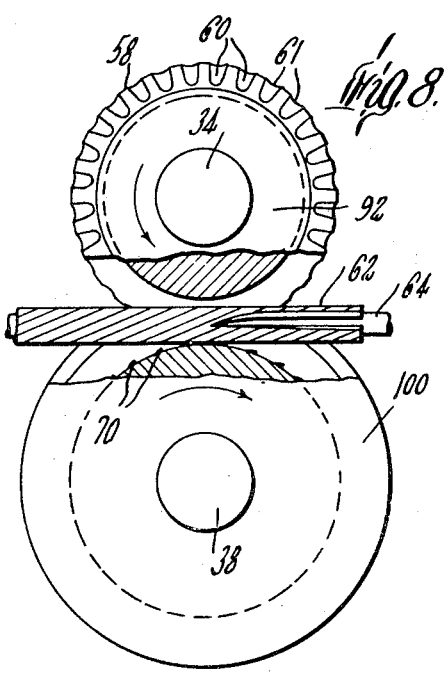
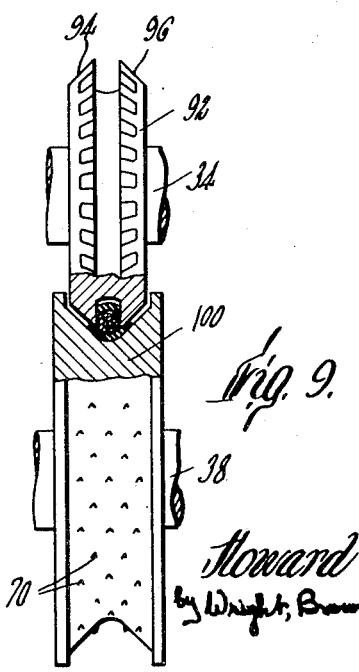

Patented Jan. 20, 1948

2,434,640

UNITED STATES PATENT OFFICE 2,434,640

MACHINE FOR STRIPPING COVERED CABLES

Howard A. Burdwood, Portland, Maine

Application October 31, 1945, Serial No. 625,736

5 Claims. (Cl. 164—61)

1

This invention relates to an apparatus for cutting and removing the covering or sheathing of covered wire cables for the recovery of the materials in the wire core and also in the covering itself.

Covers for cables are of many different kinds of materials including rubber, woven textiles, and metal. It is desirable to strip covers from the disused or unused wire cable quickly and economically. The apparatus hereinafter described was designed, and has been found to be particularly effective for this purpose.

For a more complete understanding of the invention, reference may be had to the following description of certain embodiments thereof and to the drawings, of which:

Figure 1 is a front elevation of a machine embodying the invention;

Figure 2 is a section on the line 2—2 of Figure 1;

Figure 3 is an end view of the machine shown in Figure 1;

Figure 4 is a plan view of a portion of Figure 1, the cover being removed;

Figure 5 is an elevation of a portion of Figure 1 on a larger scale;

Figure 6 is a section on a vertical plane of the parts shown in Figure 5;

Figure 7 is a sectional view of a covered wire cable showing the portion which is cut off;

Figure 8 is a side elevation of a modified form of the invention, parts being broken away to show in section;

Figure 9 is an edge elevation of the rolls shown in Figure 8, parts being broken away to show in section.

The machine illustrated in Figure 1 includes a suitable standard 10 which is hollow and which preferably contains a prime mover, such as an electric motor (not shown), the motor being connected to a pulley wheel 12 by a belt 14. The pulley wheel 12 is mounted on a shaft 16 which is journalled in a bracket 18. On the shaft 16 is also mounted a sprocket wheel 20 which is connected by a driving chain 22 to a larger sprocket wheel 24 mounted on a shaft 30. The shaft 30 is journalled in the walls of an upper frame 32 which is mounted on the standard 10. A reduced extension 34 of the shaft 30 projects outward from the frame 32, the outer end being journalled in a parallel frame 36. Parallel to the shaft extension 34 is a similar shaft 38 which is driven through a pair of gears 40 and 42 by the shaft 30, the shafts 34 and 38 thus turning in opposite directions. Parallel to the shaft 30

2 is a similar shaft 44 which is connected therewith by a pair of gears 46 and 48.

Mounted on the shafts 34 and 38 are opposed feed rolls 50 and 52 for cables of different sizes. These rolls, as shown, comprise series of disks each having a peripheral groove 54 opposite to the groove of a corresponding disk, the opposed grooves being adapted to receive a covered cable to be stripped.

As shown more clearly in Figure 5, each disk has a flange 56 with a circular peripheral knife edge 58. Each flange 56 is beveled, the plane face of the flange being adjacent the groove 54. The beveled face of the flange is gouged at intervals as at 60; these gouges resulting in shallow scallops 61 in the edge 58 so that the circular edge 58 consists of arcuate portions spaced by the scallops 61 and alternating therewith. As indicated in Figure 6, the flanges 56 are so arranged with respect to the disks 50, 52, that when a covered cable is fed between the rolls, the knife edges 58 on the opposed flanges 56 cut into the cover 62 of the cable from opposite directions to the surface of the core 64 in the cable. As is evident from Figure 6, the cuts are in a common plane which is nearly tangent to the core 64. As a result of these opposed cuts, a strip 66 is readily torn from the cable and the remaining portion 68 of the cover is thereafter readily torn from the core 64.

To insure positive feeding of the cable between the opposed rolls 50 and 52, the grooved surfaces of the rolls are roughened. To this end small spikes or spurs 70 may be struck up from the surface like the spurs on a wood rasp. The feeding of the cable by the rolls is assisted by the scalloped knife edge peripheries of the flanges 56 which also are instrumental in cutting the strip 66 from the rest of the cable cover.

For a cable of extra large size, rolls 72 and 74 are mounted on the ends of the shafts 30, 44, respectively, these rolls being similar to the rolls 50 and 52, except for size.

A suitable hood 76 is mounted over the upper rolls on the shaft extension 34 to protect the operator.

It is important that cables to be stripped be guided properly into the nip of the feeding rolls. To this end a pair of guide plates 80 and 82 are mounted at the entrance side of each pair of rolls as indicated in Figures 2 and 4. These plates are supported by suitable rods or bolts 84 which extend between the frame members 32 and 36. Spacing sleeves 86 serve to hold the guide plates properly spaced. If desired, similar guide plates 88 and 90 may be mounted at the discharge side of the rolls.

Figures 8 and 9 show a modified form of the invention which comprises a cutter roll 92 having two beveled flanges 94 and 96, each similar to the flange 56 hereinbefore described. These flanges have their plane faces opposed to each other so that their knife edges, which consist of arcuate sections of cutting edge spaced by scallops, make parallel cuts through the cover of the cable fed by the roll, these cuts being tangent to the core of the cable. Cooperating with the roll 92 is a roll 100 having no cutting edge but having a grooved periphery cooperating with the roll 92 to feed a cable so that its cover can be cut by the two beveled flanges 94 and 96 on the roll 92 as indicated in Figure 9.

It is to be understood that the foregoing description is by way of illustration and not limitation, and that various modifications and changes may be made in the structures described and illustrated herein without departing from the spirit or scope of the invention as defined by the following claims.

I claim:

1. Stripping mechanism for wire cables having a wire core and a protective cover, comprising a pair of shafts, means mounted on said shafts for feeding said cable, cutting means associated with said first mentioned means at the sides thereof, said cutting means making two continuous cuts through the cover tangentially to the core thereof, and means for driving said feeding and cutting means.

2. Stripping mechanism for wire cables having a wire core and a protective cover, comprising a pair of shafts, a pair of feed rolls mounted on said shafts, said rolls having grooves to receive a cable, cutting knives arranged on said rolls at one side thereof in a common plane, said knives engaging with said cable at a point of tangency to the core of the cable.

3. Stripping mechanism for wire cables having a wire core and a protective cover comprising a pair of shafts, a pair of feed rolls mounted on said shafts, said rolls having grooves to receive a cable, circular knives arranged on said rolls at one side thereof in a common plane, said knives engaging with said cable at a point of tangency to the core of the cable, and means for driving said feeding rolls and said cutting knives.

4. Stripping mechanism for wire cables having a wire core and a protective cover, comprising a pair of shafts, a feed roll on one of said shafts having a peripheral groove to receive and feed a cable to be stripped, and a cutter roll on the other of said shafts in a common plane with the feed roll, said cutter roll having cutting means arranged on the spaced sides thereof, said cutting means engaging with and cutting said cable at points of tangency to the core thereof.

5. Stripping mechanism for wire cables having a wire core and a protective covering, comprising a pair of shafts, a feed roll on one of said shafts having a peripheral groove with a roughened surface to receive and feed a cable to be stripped, and a cutter roll on the other of said shafts, in a common plane with the feed roll, said cutter roll having two end flanges with opposed faces in planes perpendicular to the axis of the roll and spaced apart by a distance substantially equal to the diameter of said core, said flanges being beveled to form sharp circumferential cutting edges, for engaging with said cable at points of tangency to the core thereof.

HOWARD A. BURDWOOD.

REFERENCES CITED

The following references are of record in the file of this patent:

UNITED STATES PATENTS

| Number | Name | Date |
|---|---|---|
| 1,422,901 | Terry | July 18, 1922 |
| 1,181,354 | Stevens | May 2, 1916 |
| 1,746,998 | Gamel | Feb. 11, 1930 |
| 2,366,271 | Lerch | Jan. 2, 1946 |

FOREIGN PATENTS

| Number | Country | Date |
|---|---|---|
| 225,280 | Great Britain | Nov. 27, 1924 |